(12) United States Patent
Fujita et al.

(10) Patent No.: US 9,726,796 B2
(45) Date of Patent: Aug. 8, 2017

(54) METHOD FOR MANUFACTURING HEAT-RAY SHIELDING FINE PARTICLE-CONTAINING COMPOSITION AND HEAT-RAY SHIELDING FINE PARTICLE-CONTAINING COMPOSITION, A HEAT-RAY SHIELDING FILM USING THE HEAT-RAY SHIELDING FINE PARTICLE-CONTAINING COMPOSITION AND A HEAT-RAY SHIELDING LAMINATED TRANSPARENT BASE MATERIAL USING THE HEAT-RAY SHIELDING FILM

(75) Inventors: Kenichi Fujita, Chiba (JP); Hiroshi Kobayashi, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 743 days.

(21) Appl. No.: 14/009,873

(22) PCT Filed: Apr. 12, 2012

(86) PCT No.: PCT/JP2012/002548
§ 371 (c)(1),
(2), (4) Date: Dec. 18, 2013

(87) PCT Pub. No.: WO2012/140896
PCT Pub. Date: Oct. 18, 2012

(65) Prior Publication Data
US 2014/0127522 A1    May 8, 2014

(30) Foreign Application Priority Data

Apr. 14, 2011  (JP) .................................. 2011-090514
May 27, 2011  (JP) .................................. 2011-119470

(51) Int. Cl.
  *G02B 5/20* (2006.01)
  *B82Y 30/00* (2011.01)
  *C09C 1/00* (2006.01)

(52) U.S. Cl.
  CPC .............. *G02B 5/208* (2013.01); *B82Y 30/00* (2013.01); *C09C 1/00* (2013.01); *C01P 2002/50* (2013.01); *C01P 2004/64* (2013.01); *C01P 2006/62* (2013.01); *C01P 2006/63* (2013.01); *C01P 2006/64* (2013.01); *Y10T 428/31938* (2015.04)

(58) Field of Classification Search
  USPC ........................ 430/108.6; 428/328; 252/587
  See application file for complete search history.

(56) References Cited

U.S. PATENT DOCUMENTS

| 8,853,314 B2 * | 10/2014 | Mamak .................. B82Y 30/00 524/406 |
| 2006/0178254 A1 * | 8/2006 | Takeda .................... C01G 41/00 501/1 |
| 2010/0203322 A1 * | 8/2010 | Kobayashi ........ B32B 17/10917 428/328 |
| 2012/0129090 A1 * | 5/2012 | Mamak .................. B82Y 30/00 430/108.6 |

FOREIGN PATENT DOCUMENTS

| JP | A-4-160041 | 6/1992 |
| JP | A-8-217500 | 8/1996 |
| JP | A-8-259279 | 10/1996 |
| JP | A-10-297945 | 11/1998 |
| JP | A-2001-89202 | 4/2001 |
| JP | A-2005-54201 | 3/2005 |
| JP | A-2010-202495 | 9/2010 |
| WO | WO 2010/046285 A2 | 4/2010 |

OTHER PUBLICATIONS

Written Opinion of the International Searching Authority issued in International Application No. PCT/JP2012/002548 mailed Jul. 9, 2012.
International Search Report issued in International Application No. PCT/JP2012/002548 mailed Jul. 9, 2012.

* cited by examiner

Primary Examiner — Monique Peets
(74) Attorney, Agent, or Firm — Oliff PLC

(57) ABSTRACT

To provide a heat-ray shielding film and a method for manufacturing the same, capable of exhibiting excellent optical characteristics and high weather resistance, mainly composed of polyvinyl acetal resin and using composite tungsten oxide fine particles with high heat-ray shielding effect, the method comprising: a first step of obtaining a dispersion liquid by dispersing composite tungsten oxide fine particles expressed by a general formula MyWOz and having a hexagonal crystal structure, and dispersing a dispersant into an organic solvent with a boiling point of 120 deg C. or less; a second step of obtaining a mixture by mixing metal carboxylate into the dispersion liquid obtained by the first step; and a third step of drying the mixture obtained by the second step to thereby obtain a heat-ray shielding fine particle-containing composition, and setting a content of the organic solvent remained in the heat-ray shielding fine particle-containing composition to 5 mass % or less.

9 Claims, No Drawings

METHOD FOR MANUFACTURING HEAT-RAY SHIELDING FINE PARTICLE-CONTAINING COMPOSITION AND HEAT-RAY SHIELDING FINE PARTICLE-CONTAINING COMPOSITION, A HEAT-RAY SHIELDING FILM USING THE HEAT-RAY SHIELDING FINE PARTICLE-CONTAINING COMPOSITION AND A HEAT-RAY SHIELDING LAMINATED TRANSPARENT BASE MATERIAL USING THE HEAT-RAY SHIELDING FILM

TECHNICAL FIELD

The present invention relates to a heat-ray shielding fine particle-containing composition and a method for manufacturing the same, used for a laminated transparent base material having an excellent heat-ray shielding function, and further relates to a heat-ray shielding film to which the heat-ray shielding fine particle-containing composition is applied, and a heat-ray shielding laminated transparent base material using the heat-ray shielding film.

BACKGROUND ART

A safety glass is used for automobiles, etc., with a structure that a laminated glass is formed by sandwiching an intermediate layer including polyvinyl acetal resin, etc., between opposed plurality of (for example, two) glass sheets, and further there is proposed a structure for the purpose of reducing a cooling load or a human feeling of heat by blocking a solar energy incident on a laminated glass having a heat-ray shielding function in the intermediate layer.

For example, patent literature 1 discloses a laminated glass with a soft resin layer containing heat-ray shielding metal oxide composed of tin oxide or indium oxide with a fine particle diameter of 0.1 micrometer or less, sandwiched between two opposed glass sheets.

Further, patent literature 2 discloses a laminated glass with an intermediate layer sandwiched between at least two opposed glass sheets, wherein metal such as Sn, Ti, Si, Zn, Zr, Fe, Al, Cr, Co, Ce, In, Ni, Ag, Cu, Pt, Mn, Ta, W, V, and Mo, oxide of the metal, nitride of the metal, sulfide of the metal, Sb or F-doped metal, or composite of them are dispersed in the intermediate layer.

Further, patent literature 3 discloses a window glass for automobiles with fine particles composed of $TiO_2$, $ZrO_2$, $SnO_2$, and $In_2O_3$, a glass component composed of organosilicon or organic silicon compound, sandwiched between opposed transparent plate-like members.

Further, patent literature 4 discloses a laminated glass with an intermediate layer composed of three layers, provided between at least two opposed transparent glass sheets, wherein metal such as Sn, Ti, Si, Zn, Zr, Fe, Al, Cr, Co, In, Ni, Ag, Cu, Pt, Mn, Ta, W, V, Mo, oxide of the metal, nitride of the metal, sulfide of the metal, and Sb or F-doped metal, or the composite of them is dispersed in a second layer of the intermediate layer, and the intermediate layer between a first layer and a third layer is formed as a resin layer.

Meanwhile, in patent literature 5, an applicant discloses a heat-ray shielding laminated glass formed by including the intermediate layer having a heat-ray shielding function provided between two glass sheets, with this intermediate layer formed by a heat-ray shielding film containing hexaboride fine particles alone, or hexaboride fine particles and ITO fine particles and/or ATO fine particles, and vinyl resin, or discloses a heat-ray shielding laminated glass wherein the intermediate layer is formed by a heat-ray shielding film containing the fine particles on a surface facing inside of at least one of the glass sheets, and an intermediate film containing vinyl resin interposed between the two glass sheets.

Meanwhile, as the fine particles having a shielding function in the near infrared region, composite tungsten oxide fine particles are known in addition to the aforementioned ITO fine particles, ATO fine particles and hexaboride fine particles. In patent literature 6, inventors of the present invention propose an intermediate film in which ultraviolet curing resin and a composite tungsten compound and a hexaboride compound are combined, instead of polyvinyl acetal resin.

CITATION LIST

Patent Literature

Patent Literature 1:
Japanese Patent Laid Open Publication No. 1996-217500
Patent Literature 2:
Japanese Patent Laid Open Publication No. 1996-259279
Patent Literature 3:
Japanese Patent Laid Open Publication No. 1992-160041
Patent Literature 4:
Japanese Patent Laid Open Publication No. 1998-297945
Patent Literature 5:
Japanese Patent Laid Open Publication No. 2001-89202
Patent Literature 6:
Japanese Patent Laid Open Publication No. 2010-202495

SUMMARY OF INVENTION

However, as a result of a further examination by the inventors of the present invention, following subjects are found.

A first subject is that as described above, according to the laminated glass of conventional techniques described in patent literatures 1 to 4, the heat-ray shielding function is not sufficient in any one of them when a high visible light transmittance is desired. Further, a haze value showing a cloud of a transparent base material requires 1% or less for a window glass for automobiles, and requires 3% or less for a window material for buildings. However, there is still a room for improvement in the heat-ray shielding laminated glass described in patent literature 5. Further, any one of the heat-ray shielding laminated glasses of the conventional techniques has insufficient weather-resistance in a case of a long-term use, and reduction (deterioration) of the visible light transmittance is also pointed out.

A second subject is that not only optical characteristics but also mechanical characteristics are requested for the heat-ray shielding laminated glass used in each kind of window material. Specifically, resistance to penetration is requested for the laminated glass, etc., such as a safety glass. Conventionally, in order to impart penetration resistance to the laminated glass, etc., polyvinyl acetal resin has been used for the intermediate layer. However, it is known that if composite tungsten oxide fine particles are contained in the polyvinyl acetal resin, the optical characteristic is reduced. Therefore, as a next best, for example, patent literature 6 discloses the heat-ray shielding film wherein the polyvinyl acetal resin is replaced with ultraviolet curing resin, so that the composite tungsten compound and the hexaboride are contained in the ultraviolet curing resin. However, in the market, from a viewpoint of satisfying a mechanical strength of the safety glass, etc., the polyvinyl acetal resin is strongly requested as the resin for the intermediate layer.

In view of the above-described problems, the present invention is provided, and an object of the present invention is to provide a heat-ray shielding film and a method for manufacturing the same, and a heat-ray shielding laminated transparent base material using the heat-ray shielding film, capable of exhibiting excellent optical characteristics and high weather resistance by using composite tungsten oxide fine particles mainly composed of polyvinyl acetal resin and having a high heat-ray shielding effect.

Solution to Problem

As a result of strenuous efforts for solving the above-described problems, first, inventors of the present invention achieve a completely new concept of preparing a heat-ray shielding fine particle-containing composition in which fine particles of composite tungsten oxide are dispersed in a dispersion solvent, and adding and mixing the heat-ray shielding fine particle-containing composition into polyvinyl acetal resin together with a plasticizer, and thereafter kneading a mixture.

In the new concept, the fine particles having optical characteristics such as composite tungsten oxides are added and mixed into the polyvinyl acetal resin to which the plasticizer is already added, and the mixture is kneaded so that the fine particles are uniformly dispersed, or the fine particles having the optical characteristics are added and mixed into the polyvinyl acetal resin together with the plasticizer, and thereafter the mixture is kneaded, so that the fine particles are uniformly dispersed. This is a completely different concept from a concept of a conventional technique.

In this new concept, the fine particles of the composite tungsten oxide are not agglutinated in the heat-ray shielding fine particle-containing composition, and already set in a highly dispersed state in a dispersion solvent. Therefore, it can be considered that the fine particles of the composite tungsten oxide are uniformly dispersed in the polyvinyl acetal resin by mixing and kneading the heat-ray shielding fine particle-containing composition, the polyvinyl acetal resin, and the plasticizer.

Further, it is found by the inventors of the present invention, that an organic solvent with a boiling point of 120 deg C. or less is preferable as the dispersion solvent used for the heat-ray shielding fine particle-containing composition. Moreover, it is also found that when the heat-ray shielding fine particle-containing composition is kneaded into the polyvinyl acetal resin together with the plasticizer, bubbles are not generated and an outer appearance and the optical characteristics can be satisfactorily maintained at the time of processing the heat-ray shielding fine particle-containing composition into a heat-ray shielding laminated transparent base material, provided that the content of the organic solvent with a boiling point of 120 deg C. or less is 5 mass % or less.

Then, it is also found that by adding and kneading the heat-ray shielding fine particle-containing composition into the polyvinyl acetal resin together with the plasticizer, and molding it into a film shape by a publicly-known method such as an extrusion method and calendaring, the heat-ray shielding film for a heat-ray shielding laminated transparent base material can be fabricated, which has a maximum transmittance in a visible light region and has a strong absorption in the near infrared region. The present invention is completed based on such a technical knowledge.

Namely, in order to solve the above-described problem, a first invention provides a method for manufacturing a heat-ray shielding fine particle-containing composition, comprising:

a first step of obtaining a dispersion liquid by dispersing composite tungsten oxide fine particles expressed by a general formula $M_yWO_z$ (wherein M is one kind or more elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexagonal crystal structure, and dispersing a dispersant into an organic solvent with a boiling point of 120 deg C. or less;

a second step of obtaining a mixture by mixing metal carboxylate into the dispersion liquid obtained by the first step; and a third step of drying the mixture obtained by the second step to thereby obtain a heat-ray shielding fine particle-containing composition, and setting a content of the organic solvent remained in the heat-ray shielding fine particle-containing composition to 5 mass % or less.

A second invention provides the method for manufacturing the heat-ray shielding fine particle-containing composition according to the first invention, wherein metal constituting the metal carboxylate is at least one kind of elements selected from sodium, potassium, magnesium, calcium, nickel, manganese, cerium, zinc, copper, and iron.

A third invention provides the method for manufacturing the heat-ray shielding fine particle-containing composition according to the first or second invention, wherein the organic solvent is at least one kind of elements selected from toluene, methylethyl ketone, methyl isobutyl ketone, butyl acetates, isopropyl alcohol, and ethanol.

A fourth invention provides the method for manufacturing the heat-ray shielding fine particle-containing composition according to any one of the first to third inventions, wherein the composite tungsten oxide fine particles are fine particles with an average particle size of 40 nm or less.

A fifth invention provides the method for manufacturing the heat-ray shielding fine particle-containing composition according to any one of the first to fourth inventions, wherein the composite tungsten oxide fine particles are subjected to surface treatment by a compound containing one kind or more elements of Si, Ti, Zr, and Al.

A sixth invention provides a heat-ray shielding fine particle-containing composition manufactured by the method for manufacturing a heat-ray shielding fine particle-containing composition according to any one of the first to fifth inventions.

A seventh invention provides a heat-ray shielding film manufactured by kneading the heat-ray shielding fine particle-containing composition, the polyvinyl acetal resin, and the plasticizer of the sixth invention, and molding a mixture into a film shape.

An eighth invention provides the heat-ray shielding film according to the seventh invention, wherein content (residual factor) of an organic solvent with a boiling point of 120 deg C. or less, exceeds 0 mass % and 0.06 mass % or less.

A ninth invention provides a heat-ray shielding laminated transparent base material, wherein the heat-ray shielding film of the seventh or eighth inventions is disposed between two transparent base materials.

Advantageous Effect of the Invention

According to the present invention, there is provided a heat-ray shielding film mainly composed of polyvinyl acetal resin, which is capable of exhibiting excellent optical characteristics and high weather resistance, and which is manufactured by mixing and kneading a heat-ray shielding fine particle-containing composition made of tungsten oxide fine particles having a high heat-ray shielding effect, into polyvinyl acetal resin, together with a plasticizer.

DESCRIPTION OF EMBODIMENTS

Embodiments of the present invention will be described in detail in an order of a heat-ray shielding fine particle-containing composition and a method for manufacturing the same, a heat-ray shielding film using the heat-ray shielding fine particle-containing composition and a heat-ray shielding laminated transparent base material using the heat-ray shielding film.

[1] HEAT-RAY SHIELDING FINE PARTICLE-CONTAINING COMPOSITION

The heat-ray shielding fine particle-containing composition according to the present invention contains fine particles having a heat-ray shielding function, a dispersant, an organic solvent, and a metal carboxylate, and further the other additive agents as needed.

Each component of the heat-ray shielding fine particle-containing composition will be described hereafter.

(1) Fine Particles Having the Heat-Ray Shielding Function

The fine particles having the heat-ray shielding function used for the heat-ray shielding fine particle-containing composition according to the present invention, are composite tungsten oxide fine particles. The composite tungsten oxide fine particles largely absorb a light in a near infrared region and particularly the light with a wavelength of 1000 nm or more, and therefore its transmitted color tone is bluish color tone in many cases.

A particle size of each composite tungsten oxide fine particle can be suitably selected depending on a purpose of use of the heat-ray shielding film. For example, in a case of using the heat-ray shielding film for a usage requiring transparency, preferably each composite tungsten oxide fine particle has a dispersion particle size of 40 nm or less. The reason is as follows. If the composite tungsten oxide fine particle has a dispersion particle size smaller than 40 nm, scattering is suppressed, and as a result, the light is not completely shielded, and therefore visibility of a visible light region can be maintained and simultaneously the transparency can be maintained efficiently.

When the heat-ray shielding film and the heat-ray shielding laminated transparent base material of the present invention are applied to the usage emphasizing the transparency of the visible light region in particular like a front glass of automobiles for example, scattering by particles is preferably taken into consideration. Then, when reduction of the scattering by particles is emphasized, the dispersion particle size of the composite tungsten oxide fine particle is set to 30 nm or less and is preferably set to 25 nm or less.

This is because light scattering in the visible light region with a wavelength of 400 nm to 780 nm by geometric scattering or Mie scattering can be reduced, provided that the dispersion particle size of the composite tungsten oxide fine particle is smaller. By reducing the scattering of the light, a situation that the heat-ray shielding film has an outer appearance of a frosted glass when being irradiated with a strong light and a clear transparency is lost, can be prevented.

This is because if the dispersion particle size of the composite tungsten oxide fine particle is 40 nm or less, the geometric scattering or the Mie scattering are reduced, and a Rayleigh scattering region is formed, and in the Rayleigh scattering region, scattered lights are reduced in inverse proportion to the sixth power of the particle size, and therefore scattering is reduced with a reduction of the dispersion particle size and the transparency is improved. Further, if the dispersion particle size of the composite tungsten oxide fine particle is 25 nm or less, the scattered lights are extremely reduced, and this is preferable.

As described above, from a viewpoint of preventing the light scattering, a smaller dispersion particle size of the composite tungsten oxide fine particle is preferable, and in a case that the dispersion particle size of the composite tungsten oxide fine particle is 1 nm or more, industrial manufacture is facilitated.

Further, quantity of the composite tungsten fine particles contained in the heat-ray shielding film is preferably 0.2 $g/m^2$ to 2.5 $g/m^2$ per unit area.

The composite tungsten oxide fine particles, being the fine particles having the heat-ray shielding function, and a method for manufacturing the same will be further described hereafter.

(a) Composite Tungsten Oxide Fine Particles

As examples of preferable composite tungsten oxide fine particles, $Cs_{0.33}WO_3$, $Rb_{0.33}WO_3$, $K_{0.33}WO_3$, $Ba_{0.33}WO_3$, etc., can be given. A useful heat-ray shielding characteristic can be obtained, provided that values of y, z are within the aforementioned range. An addition amount of added element M is preferably 0.1 or more and 0.5 or less, and further preferably in the vicinity of 0.33. This is because the value theoretically calculated from the hexagonal crystal structure is 0.33, and preferable optical characteristics can be obtained by the addition amount around 0.33. Further, Z is preferably in a range of $2.2<=z<=3.0$. This is because a similar mechanism as the mechanism of a tungsten oxide material expressed by WOx works in the composite tungsten oxide material expressed by $MyWOz$, and there is a supply of free electrons by adding element M as described above in a range of $z<=3.0$ is further preferably in a range of $2.45<=z<=3.00$ from a viewpoint of the optical characteristics.

(b) The Method for Manufacturing the Composite Tungsten Oxide Fine Particles

The composite tungsten oxide fine particle expressed by a general formula $M_YWO_Z$ can be obtained by applying heat treatment to a tungsten compound starting material in an inert gas atmosphere or in a reducing gas atmosphere.

First, the tungsten compound starting material will be described.

Preferably the tungsten compound starting material is one kind or more of tungsten trioxide powder, tungsten dioxide powder, hydrate powder of tungsten oxide, tungsten hexachloride powder, ammonium tungstate powder, or hydrate powder of tungsten oxide obtained by dissolving the tungsten hexachloride into alcohol and drying it thereafter, or hydrate powder of tungsten oxide obtained by dissolving the tungsten hexachloride into alcohol and thereafter adding water thereto and precipitating and drying the dissolved tungsten hexachloride, or tungsten compound powder obtained by drying ammonium tungstate aqueous solution, and metal tungsten powder.

When the composite tungsten oxide fine particles are manufactured, ammonium tungstate aqueous solution and a tungsten hexachloride solution are further preferably used, from a viewpoint that each element with a starting material in a solution state, can be easily uniformly mixed. By using such a material and applying heat treatment to the material in an inert gas atmosphere or in a reducing gas atmosphere, the composite tungsten oxide fine particles can be obtained. Further, a tungsten compound containing element M in a form of an element simple body or in a form of a compound, is used as a starting material.

Wherein, in order to manufacture the starting material in which each component is uniformly mixed in a molecular level, each raw material is preferably mixed in a form of a solution, and preferably the tungsten compound starting material containing element M can be solved in a solvent such as water and organic solvent. For example, tungstate containing element M, chloride salt, nitrate, sulfate, oxalate, oxide, carbonate, and hydroxide, etc., can be given. However, the tungsten compound starting material is not limited thereto, and a solution state is more preferable.

Heat treatment in the inert gas atmosphere or in the reducing gas atmosphere will be described next. First, 650 deg C. or more is preferable as a heat treatment condition in the inert gas atmosphere. The starting material that has undergone heat treatment at 650 deg C. or more has a sufficient near infrared absorption power and is more efficient as the heat-ray shielding fine particle. The inert gas such as Ar and $N_2$ is used as the inert gas.

Further, as the heat treatment condition in the reducing gas atmosphere, heat treatment is applied to the starting material first in the reducing gas atmosphere at 100 deg C. or more and 650 deg C. or less, and subsequently heat treatment is further applied thereto in the inert gas atmosphere at 650 deg C. or more and 1200 deg C. or less. Although the reducing gas used at this time is not particularly limited, $H_2$ gas is preferable. Then, in a case of using $H_2$ as the reducing gas, 0.1% or more of $H_2$ by volume ratio is preferably mixed into the inert gas such as Ar and $N_2$, and 0.2% or more of $H_2$ is further preferably mixed thereinto. If 0.1% or more of $H_2$ is mixed by volume ratio, reducing process can be efficiently in progress.

The starting material powder reduced by hydrogen includes Magneri phase, thus showing excellent heat-ray shielding characteristics. Accordingly, in this state as well, this starting material powder can be used as the heat-ray shielding fine particle.

From a viewpoint of weather resistance, it is preferable that the composite tungsten oxide fine particle of the present invention is subjected to surface treatment, and is coated with a compound containing one kind or more elements selected from Si, Ti, Zr, and Al, and preferably is coated with oxide. In order to perform the surface treatment, a publicly-known surface treatment may be performed using an organic compound containing one kind or more elements selected from Si, Ti, Zr, and Al. For example, the composite tungsten oxide fine particles of the present invention and an organic silicon compound are mixed, and a mixture may be subjected to hydrolysis treatment.

Further, in order to obtain a desired heat-ray shielding fine particle-containing composition, a powder color of the composite tungsten oxide fine particle desirably satisfies a condition such that L* is 25 to 80, a* is −10 to 10, and b* is −15 to 15 in a powder color based on a L*a*b* surface color system (JISZ8729-2004) which is recommended by Commission Internationale de lEclairage (CIE). By using the composite tungsten oxide fine particles having this powder color, the heat-ray shielding film having excellent optical characteristics can be obtained.

(2) Dispersant

It is preferable that the dispersant of the present invention has urethane, acrylic, and styrene main chains, having a thermal decomposition temperature of 200 deg C. or more which is measured by a simultaneous differential calorimetry device (described as TG-DTA hereafter in some cases). Wherein, a thermal decomposition temperature is the temperature for starting a weight reduction due to thermal decomposition of the dispersant, in TG-DTA measurement.

This is because if the thermal decomposition temperature is 200 deg C. or more, the dispersant is not decomposed when being kneaded with the polyvinyl acetal resin. Thus, it is possible to prevent brown coloring of the heat-ray shielding film for a heat-ray shielding laminated glass due to decomposition of the dispersant, reduction of a visible light transmittance, and a situation that original optical characteristics cannot be obtained.

Further, the dispersant preferably has an amine-containing group, a hydroxyl group, a carboxyl group, or an epoxy group as functional groups. These functional groups are adsorbed on a surface of the composite tungsten oxide fine particle, thus preventing agglutination of the composite tungsten oxide fine particles, and having an effect of uniformly dispersing the fine particles even in the heat-ray shielding film.

Specifically, an acrylic-styrene copolymer-based dispersant having the carboxyl group as a functional group, and an acrylic dispersant having a group containing amine as a functional group, can be given. As the dispersant having the amine-containing group as the functional group, the dispersant with a molecular weight of Mw 2000 to 200000 and an amine value of 5 to 100 mgKOH/g is preferable. Further, as the dispersant having the carboxyl group, the dispersant with a molecular weight of Mw 2000 to 200000 and an acid value of 1 to 50 mgKOH/g is preferable.

The addition amount of the dispersant is preferably in a range of 10 pts.wt. to 1000 pts.wt. and further preferably 30 pts.wt. to 400 pts.wt. based on 100 pts. Wt. of the composite tungsten oxide fine particles. This is because when the dispersant addition amount is within this range, the composite tungsten oxide fine particles are uniformly dispersed in the polyvinyl acetal resin, thus not having an adverse influence on physical properties of the obtained heat-ray shielding film.

(3) Organic Solvent

The organic solvent used for the heat-ray shielding particle-containing composition of the present invention having a boiling point of 120 deg C. or less is preferably used.

The organic solvent having the boiling point of 120 deg C. or less can be easily removed particularly by vacuum drying. This is because removing the organic solvent in a vacuum-drying process is speedily advanced as a result, which contributes to a productivity of the heat-ray shielding fine particle-containing composition. Further, since the vacuum-drying process is easily and sufficiently advanced, a situation that an excessive organic solvent remains in the heat-ray shielding fine particle-containing composition of the present invention, can be prevented. As a result, a situation that trouble such as generating bubbles during molding the heat-ray shielding film, can be prevented. Specifically, toluene, methylethyl ketone, methyl isobutyl ketone, butyl acetates, isopropyl alcohol, and ethanol can be given. However, the organic solvent can be arbitrarily selected provided that it has a boiling point of 120 deg C. or less and capable of uniformly dispersing the fine particles having the heat-ray shielding function.

A blending amount of the organic solvent with respect to the fine particles having the heat-ray shielding function, will be described in column "[2] (1) in the method for manufacturing the heat-ray shielding fine particle-containing composition" as will be described later.

(4) Metal Carboxylate

The metal carboxylate used for the heat-ray shielding fine particle-containing composition of the present invention, is added for the purpose of reducing the change of the optical characteristics in a long-term use of the heat-ray shielding film. Namely, it is probable that the metal carboxylate has a function of suppressing the degradation of the composite tungsten oxide fine particles with a lapse of time. Its specific mechanism is not clarified yet. A specific effect of adding the metal carboxylate is that reduction (degradation) of the visible light transmittance is small at an initial time of use and after a long-term use of the laminated transparent base material, when the heat-ray shielding laminated transparent base material is used for a long time. When the metal carboxylate is not added, it is confirmed that the visible light transmittance is reduced (degraded) compared with that of the initial time.

As a result of various examinations by the inventors of the present invention, an effect of suppressing degradation of the visible light transmittance is confirmed, by using alkaline metal salts, alkaline earth metal salts, and transition metal salts, as the metal salts used for the metal carboxylate. For example, salts of sodium, potassium, magnesium, calcium, nickel, manganese, cerium, zinc, copper, and iron, can be given, and particularly salts of nickel, manganese, cerium, zinc, copper, and iron are desirable.

Further, the carboxylic acid used for the metal carboxylate is not particularly limited. For example, acetic acid, butyric acid, valeric acid, propionic acid, hexane acid, enantoic acid, carpylic acid, pelargonic acid, capric acid, lauric acid, myristic acid, palmitic acid, margaric acid, stearic acid, 2-ethylhexanoic acid, and other generally known higher fatty acid can be given.

The addition amount of the metal carboxylate is preferably in a range of 3 pts.wt. to 500 pts.wt. based on 100 pts.wt. of the composite tungsten oxide fine particles. This is because if the addition amount of the metal carboxylate is within the aforementioned range, the effect of improving the weather resistance of the composite tungsten oxide fine particles can be exhibited, thus having no adverse influence on the physical properties of the obtained heat-ray shielding film.

(5) Other Additive Agent

A general additive agent can also be blended into the heat-ray shielding film of the present invention as needed. For example, die or pigment generally utilized for coloring a thermoplastic resin such as azo dye, cyanine dye, quinolones dye, perylene die, and carbon black, may also be added, to thereby impart an arbitrary color tone as needed. Further, hindered phenol-based or phosphor-based stabilizers as ultraviolet absorbers, a release agent, hydroxybenzophenon, salicylic acid, HALS, triazole, triazine based organic UV, inorganic ultraviolet absorbers such as zinc oxide, titanium oxide, and cerium oxide, may also be added. Further, a coupling agent, a surfactant, and an anti-static additive can also be used as additive agents.

[2] THE METHOD FOR MANUFACTURING THE HEAT-RAY SHIELDING FINE PARTICLE-CONTAINING COMPOSITION

The heat-ray shielding fine particle-containing composition according to the present invention is manufactured by a first step of obtaining a dispersion liquid by dispersing fine particles having a heat-ray shielding function and a dispersant into an organic solvent; and a second step of obtaining a mixture by mixing metal carboxylate into the dispersion liquid obtained by the first step; and a third step of removing the mixture obtained by the second step until a residual amount of the organic solvent after drying is 5 mass % or less.

Each manufacturing process according to the method for manufacturing the heat-ray shielding fine particles-containing composition, will be described hereafter.

(1) The Step of Obtaining the Dispersion Liquid by Dispersing the Fine Particles Having the Heat-Ray Shielding Function and the Dispersant into the Organic Solvent (First Step)

A method for dispersing the composite tungsten oxide fine particles into the organic solvent, can be arbitrarily selected, provided that this is the method for uniformly dispersing the fine particles into the organic solvent. As a specific example, methods such as bead mill, ball mill, sand mill, and ultrasonic dispersion, can be used.

The concentration of the composite tungsten oxide fine particles in the organic solvent is preferably set to 5 to 50 mass %. This is because by setting it to 5 mass % or more, a situation that an amount of the organic solvent to be removed is excessively increased, thus also increasing a manufacturing cost, can be prevented. Further, this is because by setting it to 50 mass % or less, a situation that fine particles are easily agglutinated, thus making it difficult to disperse the fine particles, and a situation that viscosity of liquid is remarkably increased, thus making it difficult to be handled, can be prevented.

Further, the composite tungsten oxide fine particles in the dispersion liquid are preferably dispersed, with an average particle size of 40 nm or less. This is because by setting the average particle size to 40 nm or less, the optical characteristics such as haze of the heat-ray shielding film after processing can be further preferably improved.

Note that it can also be considered that the composite tungsten oxide fine particles are dispersed into the plasticizer added to the heat-ray shielding film as will be described later, together with the dispersant. However, if the composite tungsten oxide and the dispersant are dispersed into the plasticizer, a long time is sometimes required for dispersion, because viscosity of the plasticizer is high compared with the viscosity of the organic solvent. Therefore, the heat-ray shielding fine particle-containing composition of the present invention has the step of dispersing the composite tungsten oxide into the organic solvent with low viscosity and removing the organic solvent thereafter which is not required for the heat-ray shielding film in the drying step.

(2) the Step of Mixing the Metal Carboxylate into the Dispersion Liquid Obtained by the First Step, and Obtaining a Mixture (Second Step)

The metal carboxylate is mixed in the second step after the dispersion liquid is obtained by the first step in the method for manufacturing the heat-ray shielding fine particle-containing composition according to the present invention. A publicly-known mixing method may be used as the method for mixing the metal carboxylate. The metal carboxylate is added in the second step, for not affecting the dispersion of the composite tungsten oxide fine particles in the first step, being a dispersion step.

(3) The Step of Removing the Organic Solvent after Drying Until the Residual Amount of The Organic Solvent Becomes 5 Mass % or Less, by Drying the Mixture by the Second Step (Third Step)

The drying step of obtaining the heat-ray shielding fine particle-containing composition according to the present invention is the step performed for removing the organic solvent. In this step, a method of vacuum-drying the obtained mixture, is preferably used. Specifically, in the vacuum drying method, the mixture is vacuum-dried while being stirred, to thereby separate the heat-ray shielding fine particle-containing composition from the organic solvent component. As an apparatus used for the vacuum-drying, a vacuum stirring type drier can be given. However, the apparatus is not particularly limited thereto, provided that it has the aforementioned function. Further, a vacuum-pressure of the drying step is suitably selected.

By using the vacuum drying method, removing efficiency of the solvent is improved, and agglutination of the dispersed fine particles does not occur because the heat-ray shielding fine particle-containing composition is not exposed to a high temperature for a long time, and this is preferable. Further, productivity is also increased, and recovery of the evaporated organic solvent is facilitated, and this is also preferable from an environmental viewpoint.

In the heat-ray shielding fine particle-containing composition after the drying step, the residual organic solvent is required to be 5 mass % or less. This is because If the remained organic solvent is 5 mass % or less, as will be described in "[3] Heat-ray shielding film" later, the content of the organic solvent in the heat-ray shielding film can be set to 0.06 mass % or less, and therefore bubbles are not generated in processing it into the heat-ray shielding laminated transparent base material, and an outer appearance and the optical characteristics can be satisfactorily maintained. Even if the organic solvent remained in the heat-ray shielding fine particle-containing composition exceeds 5 mass %, it seems that the amount of the organic solvent remained in the heat-ray shielding film can be suppressed to 0.06 mass % or less by controlling a mixing ratio with the polyvinyl acetal resin as will be described later. However, when the organic solvent in the heat-ray shielding fine particle-containing composition exceeds 5 mass %, in order to suppress the content of the organic solvent remained in the heat-ray shielding film to 0.06 mass % or less, an addition amount of the composite tungsten oxide fine particles is required to be secured while reducing the addition amount of the heat-ray shielding fine particle-containing composition added to the heat-ray shielding film (or while increasing the addition amount of the polyvinyl acetal resin added to the heat-ray shielding film). Therefore, the content of the composite tungsten oxide fine particles in the dispersion liquid used for manufacturing the heat-ray shielding fine particle-containing composition exceeds 50 mass %, thus easily causing agglutination to occur.

Therefore, in order to prevent the agglutination of the composite tungsten oxide fine particles in the dispersion liquid, and maintain the dispersion of the composite tungsten oxides in the heat-ray shielding film, and exhibit the optical characteristics, the organic solvent remained in the heat-ray shielding fine particle-containing composition is required to be set to 5 mass % or less.

[3] THE HEAT-RAY SHIELDING FILM

The heat-ray shielding film of the present invention is obtained by mixing and kneading the aforementioned heat-ray shielding fine particle-containing composition, polyvinyl acetal resin, plasticizer, and the other additives or regulators of an adhesive force as needed, and thereafter molding the mixture into a film shape by a publicly-known method such as an extrusion method and calendaring. The content (residual factor) of the organic solvent of the heat-ray shielding film of the present invention is 0.06 mass % or less.

The polyvinyl acetal resin, the plasticizer, and the regulators of an adhesive force, and further the method for manufacturing the heat-ray shielding film, will be described hereafter.

(1) Polyvinyl Acetal Resin

Polyvinyl butyral resin is preferable as the polyvinyl acetal resin used for the heat-ray shielding film of the present invention. Further, a plurality of kinds of polyvinyl acetal resins with different degree of acetalization may be used together in consideration of the physical properties of the heat-ray shielding film. Further, copolyvinyl acetal resin obtained by causing a reaction between a plurality of kinds of aldehydes which are combined during acetalization, can also be preferably used.

Wherein, a preferable lower limit of the acetalization of the polyvinyl acetal resin is 60% and an upper limit thereof is 75%.

The aforementioned polyvinyl acetal resin can be prepared by acetalizing the polyvinyl alcohol by aldehyde.

Usually, the aforementioned polyvinyl alcohol can be obtained by saponifying polyvinyl acetate, and the polyvinyl alcohol with the degree of saponification of 80 to 99.8 mol %, is generally used.

Further, a preferable lower limit of a polymerization degree of the polyvinyl alcohol is 200, and an upper limit thereof is 3000. If the polymerization degree is 200 or more, the penetration resistance of the manufactured heat-ray shielding laminated transparent base material is maintained, thus maintaining safety. Meanwhile, if the polymerization degree is 3000 or less, moldability of a resin film is maintained, thus maintaining rigidity of the resin film in a preferably range in which it is not excessively large, and also maintaining processability.

The aldehyde is not particularly limited, and aldehyde with carbon number of 1 to 10 such as n-butyl aldehyde, isobutyl aldehyde, 2-ethylbuthl aldehyde, n-hexyl aldehyde, n-octyl aldehyde, acetaldehyde, is generally used. Above all, n-butyl aldehyde, n-hexyl aldehyde, and n-valeraldehyde are preferable, and butylaldehyde with carbon number of 4 is further preferable.

(2) Plasticizer

As the plasticizer used for the heat-ray shielding film and further used for the heat-ray shielding laminated transparent base material as will be described later according to the present invention, ester-based plasticizer such as monohydric alcohol and organic acid ester and a polyhydric alcohol organic acid ester compound, and phosphoric acid plasticizer such as organic phosphoric acid plasticizer, can be given, and any one of them is preferably in a liquid state at a room temperature. Particularly, the plasticizer as the ester compound synthesized from the polyhydric alcohol and fatty acid is preferable.

Although the ester compound synthesized from the polyhydric alcohol and the fatty acid is not particularly limited, for example, a glycol-based ester compound obtained by a reaction between glycol such as triethylene glycol, tetraehtylene glycol, tripropylene glycol, and monobasic organic acid such as butyric acid, isobutyric acid, caproic acid, 2-ethyl butyric acid, heptyl acid, n-octylic acid, 2-ethylhexyl acid, pelargonic acid (n-nonylic acid), and decylic acid, can be given. Further, an ester compound of the tetraethylene glycol, the tripropylene glycol, and the monobasic organic acid, can also be given.

Above all, fatty acid ester of triethylene glycol hexanate, triethylene glycol di-2-ethyl butylate, toriethylene glycol di-octanate, triethylene glycol di-2-ethylhexanate, is suitable. The fatty acid ester of triethylene glycol has well-balanced various properties such as compatibility with polyvinyl acetal and cold-resistance, and is excellent in processability and economic efficiency.

The plasticizer not used for the plasticizer dispersion liquid for a heat-ray shielding film may be further added to the heat-ray shielding film of the present invention, in consideration of the physical properties of the heat-ray shielding film. For example, it is also acceptable to add an ester compound of polybasic carboxylic acid such as adipic acid, sebacic acid, azelaic acid, and linear or branched alcohol with carbon number of 4 to 8, or add a phosphoric acid-based plasticizer.

Total addition amount of these plasticizers into the heat-ray shielding film may be determined in consideration of the physical properties of the heat-ray shielding film. A desirable total addition amount is 10 mass % to 70 mass %.

(3) The Regulator of an Adhesive Force

Further, the regulator of an adhesive force is preferably contained in the heat-ray shielding film of the present invention.

The alkaline metal salts and/or the alkaline earth metal salts are suitably used. Acid constituting the metal salt is not particularly limited, and for example, the carboxylic acid such as octylic acid, hexyl acid, butyric acid, acetic acid, and formic acid, or inorganic acid such as hydrochloric acid and nitric acid, can be given. In the alkaline metal salts and/or the alkaline earth metal salts, carboxylic acid magnesium salt with carbon number of 2 to 16, and carboxylic acid potassium salt with carbon number of 2 to 16 are preferable.

The magnesium salt and the potassium salt of carboxylic acids, being organic acids with carbon number of 2 to 16 are not particularly limited, and for example, magnesium acetate, potassium acetate, magnesium propionate, potassium propionate, magnesium 2-ethyl butyrate, potassium 2-ethyl butyrate, magnesium 2-ethylhexanoate, potassium 2-ethylhexanoate, are suitably used. These regulators of an adhesive force may be used alone, or two kinds or more of them may be used together.

Note that in a case of using the carboxylic acid salts of sodium, potassium, magnesium, calcium, and cerim, as the regulators of an adhesive force, both of an action as an original regulator of an adhesive force and an action of improving the weather resistance of the composite tungsten oxide fine particle can be obtained.

(4) The Method for Manufacturing the Heat-Ray Shielding Film

The heat-ray shielding film of the present invention is obtained by mixing and kneading the aforementioned heat-ray shielding fine particle-containing composition, polyvinyl acetal resin, and plasticizer, and thereafter molding the mixture into a film shape by the publicly-known method such as an extrusion method and calendaring. Note that the polyvinyl acetal resin into which the plasticizer is previously kneaded, and the heat-ray shielding fine particle-containing composition may also be kneaded. Thus, when the plasticizer and the heat-ray shielding fine particle-containing composition are separately kneaded into the polyvinyl acetal resin as described above, total content of the plasticizer contained in the heat-ray shielding film should be noted.

(5) Content (Residual Rate) of the Organic Solvent in the Heat-Ray Shielding Film The heat-ray shielding film of the present invention is obtained by kneading the heat-ray shielding fine particle-containing composition, the polyvinyl acetal resin, and the plasticizer. However, 5 mass % or less of the organic solvent with a boiling point of 120 deg C. or less such as toluene, methylethyl ketone, methyl isobutyl ketone, butyl acetates, isopropyl alcohol, and ethanol is contained in the heat-ray shielding fine particle-containing composition. Therefore, the heat-ray shielding film of the present invention contains the organic solvent with a boiling point of 120 deg C. or less. Wherein, it is preferable that the heat-ray shielding film does not contain the organic solvent with a boiling point of 120 deg C. or less such as toluene, methylethyl ketone, methyl isobutyl ketone, butyl acetates, isopropyl alcohol, and ethanol as much as possible. However, the heat-ray shielding film of the present invention contains the organic solvent with a boiling point of 120 deg C. or less inevitably derived from the heat-ray shielding fine particle-containing composition.

In the heat-ray shielding film of the present invention, the content of the organic solvent with a boiling point of 120 deg C. or less is set to 0.06 mass % or less. As described above, when the heat-ray shielding fine particle-containing composition of the present invention is used as a raw material of the heat-ray shielding film of the present invention, the content of the organic solvent is 5 mass % or less. Therefore, the content of the organic solvent with a boiling point of 120 deg C. or less in the heat-ray shielding film of the present invention, is set to 0.06 mass % or less by controlling a kneading ratio of the heat-ray shielding fine particle-containing composition, the polyvinyl acetal resin, and the plasticizer, and controlling an amount of the organic solvent contained in the heat-ray shielding fine particle-containing composition.

Fine bubbles are not generated on the heat-ray shielding intermediate film, provided that the content of the organic solvent with a boiling point of 120 deg C. or less in the heat-ray shielding film of the present invention is 0.06 mass % or less, thus making it possible to prevent a problem that a heat-ray shielding intermediate film is turned into a frosted glass to thereby reduce the visible light transmittance.

[4] HEAT-RAY SHIELDING LAMINATED TRANSPARENT BASE MATERIAL

The heat-ray shielding laminated transparent base material, is obtained by integrally sticking two opposed transparent base materials similar to inorganic glasses, with the heat-ray shielding film sandwiched between them by a publicly-known method. The obtained heat-ray shielding laminated glass can be used mainly as front glasses for automobiles or windows of buildings.

Similarly to the aforementioned glass using a transparent resin, by using the transparent resin as the transparent base material, or by using the transparent resin together with the aforementioned glass with the heat-ray shielding film sandwiched between the opposed transparent base materials, the heat-ray shielding laminated transparent base material can be obtained. The purpose of use is similar to that of the heat-ray shielding laminated glass.

The heat-ray shielding film can be used as a simple body, or it can also be used by being disposed on one surface or on both surfaces of the transparent base material such as glass or transparent resin.

[5] CONCLUSION

As described above in detail, the heat-ray shielding fine particle-containing composition can be obtained by mixing the metal carboxylate into the dispersion liquid obtained by dispersing the composite tungsten oxide fine particles and the dispersant as the heat-ray shielding components, into the organic solvent with a boiling point of 120 deg C. or less, and thereafter by removing the organic solvent until the content of the organic solvent is 5 mass % or less using the vacuum-drying method. Then, the heat-ray shielding film for the heat-ray shielding laminated transparent base material having the maximum transmittance in the visible light region and having a strong absorption in the near infrared region, can be fabricated by kneading the heat-ray shielding fine particle-containing composition, the polyvinyl acetal resin, and the plasticizer, and molding the mixture into a film shape by the publicly-known method.

EXAMPLES

The present invention will be specifically described hereafter, with reference to examples. However, the present invention is not limited to the examples described below.

Further, the powder color of the composite tungsten oxide fine particles in each example (visual field: 10 degrees, light source: D65) and the visible light transmittance of the heat-ray shielding laminated transparent base material, and the solar transmittance were measured using a spectrophotometer U-4000 by Hitachi, Ltd. Note that the solar transmittance is an index showing a heat-ray shielding performance of the heat-ray shielding laminated transparent base material.

Further, a haze value was measured based on JISK7105 using HR-200 by Murakami Color Research Laboratory CO., Ltd.

The change in the optical characteristics of the heat-ray shielding film in a case of a long-term use of the heat-ray shielding laminated transparent base material, was evaluated from a change rate of the visible light transmittance before/after an acceleration test which was carried out using a xenon-arc lamp type weather resistance testing machine (xenon weather Ometer) in which the heat-ray shielding film was left for 200 hours to obtain the change rate of the visible light transmittance. Note that a relation between a wavelength of the xenon ark lamp of the xenon weather Ometer and a spectral radiant intensity (spectral distribution) is approximated to the spectral distribution of solar lights.

Example 1

50 g of $H_2WO_4$ and 18.7 g of $Cs(OH)_2$ (corresponding to Cs/W(molar ratio)=0.3) were sufficiently mixed by an agate mortar, to thereby obtain a mixed powder. The mixed powder was heated under supply of 5% $H_2$ gas with $N_2$ gas as a carrier, which was then subjected to reducing treatment for 1 hour at a temperature of 600 deg C., and thereafter was sintered at 800 deg C. for 30 minutes under $N_2$ gas atmosphere, to thereby obtain fine particles (abbreviated as fine particles a hereafter).

A composition formula of the fine particles a was $Cs_{0.33}WO_3$, wherein the powder color was expressed in such a way that L* was 35.2845, a* was 1.4873, and b* was −5.2114.

20 mass % of fine particles a, 10 mass % of acrylic dispersant having a group containing amine as a functional group (amine value 15 mgKOH/g, acrylic dispersant with a decomposition temperature of 230 deg C. (abbreviated as dispersant a hereafter)), and 70 mass % of methyl isobutyl ketone (MIBK) were weighed. They were charged into a paint shaker in which $ZrO_2$ beads with a diameter of 0.3 mm are accommodated, which were then pulverized and dispersed for 6 hours, to thereby prepare a composite tungsten oxide fine particle dispersion liquid (abbreviated as liquid A hereafter).

Wherein, a dispersion average particle size of the tungsten oxide fine particle in the liquid A was measured by a microtrack particle size distribution analyzer by Nikkiso Co., Ltd., and it was found that the dispersion average particle size was 19 nm.

40 pts.wt. of the dispersant a and 10 pts.wt. of manganese acetate were mixed into 100 pts.wt. of the liquid A. The mixture was charged into a stirring type vacuum drier (Henschel mixer by Mitsui Mining Company, Limited.), and was subjected to vacuum-drying by being heated and dried for 2 hours at 80 deg C. so that methyl isobutyl ketone is removed, to thereby obtain the heat-ray shielding fine particle-containing composition according to example 1 (abbreviated as composition A hereafter).

Wherein, the content of residual methyl isobutyl ketone of the composition A was measured by a dry based moisture meter, and it was found that the content of the residual methyl isobutyl ketone was 3.5 mass %.

0.8 mass % of the obtained composition A, 28.2 mass % of the plasticizer a, and 70 mass % of the polyvinyl acetal resin were mixed and charged into a twin screw extruder as a resin composition. Then, the resin composition was kneaded at 200 deg C. and extruded from a T-die, and was molded by calendaring to 0.7 mm thickness, to thereby obtain the heat-ray shielding film for the heat-ray shielding laminated transparent base material according to example 1 (abbreviated as shielding film A hereafter). The content of the methyl isobutyl ketone of the shielding film A was calculated to be 0.028 mass %.

The obtained shielding film A was sandwiched by two inorganic glasses, to thereby obtain the heat-ray shielding laminated base material (abbreviated as laminated transparent base material A hereafter) according to example 1, by the publicly-known method.

As shown in table 1, as the optical characteristics of the laminated transparent base material A, the solar transmittance was 35.1%, and the haze value was 0.4%, when the visible light transmittance was 70.2%.

The change of the visible light transmittance after 200 hours was measured by the acceleration test, using the xenon weather Ometer and using the laminated transparent base material A as a test sample. The change of the visible light transmittance was −0.8%, and the result was shown in table 1.

Example 2

The plasticizer dispersion liquid for the heat-ray shielding film (abbreviated as dispersion liquid B hereafter) according to example 2 was prepared similarly to example 1 excluding a point that manganese acetate was replaced with iron acetate, as the metal carboxylate.

Wherein, the content of residual methyl isobutyl ketone of the composition B was measured by the dry based moisture meter, and it was found that the content of the residual methyl isobutyl ketone was 3.7 mass %. Further, the dispersion average particle size of the tungsten oxide fine particle in the dispersion liquid B was measured by a microtrack particle size distribution analyzer by Nikkiso Co., Ltd., and it was found that the dispersion average particle size was 23 nm.

The heat-ray shielding film B (abbreviated as shielding film B hereafter) was obtained similarly to the example 1 excluding a point that the composition A was replaced with a composition B, to thereby obtain the heat-ray shielding laminated transparent base material (abbreviated as laminated transparent base material B hereafter) according to example 2. The content of the methyl isobutyl ketone of the shielding film B was calculated to be 0.03 mass %.

As shown in table 1, as the optical characteristics of the laminated transparent base material B, the solar transmittance was 35.9%, and the haze value was 0.4%, when the visible light transmittance was 71.6%.

The change of the visible light transmittance after 200 hours was measured by the acceleration test, using the xenon weather Ometer and using the laminated transparent base material B as a test sample. The change of the visible light transmittance was −0.5%, and the result was shown in table 1.

Example 3

The plasticizer dispersion liquid for the heat-ray shielding film (abbreviated as dispersion liquid C hereafter) according to example 3 was prepared similarly to example 1 excluding a point that manganese acetate was replaced with copper acetate, as the metal carboxylate.

Wherein, the content of residual methyl isobutyl ketone of the composition C was measured by the dry based moisture meter, and it was found that the content of the residual methyl isobutyl ketone was 2.8 mass %. Further, the dispersion average particle size of the tungsten oxide fine particle in the dispersion liquid C was measured by a microtrack particle size distribution analyzer by Nikkiso Co., Ltd., and it was found that the dispersion average particle size was 25 nm.

The heat-ray shielding film C (abbreviated as shielding film C hereafter) was obtained similarly to the example 1 excluding a point that the composition A was replaced with a composition C, to thereby obtain the heat-ray shielding laminated transparent base material (abbreviated as laminated transparent base material C hereafter) according to example 3. The content of the methyl isobutyl ketone of the shielding film C was calculated to be 0.022 mass %.

As shown in table 1, as the optical characteristics of the laminated transparent base material C, the solar transmittance was 35.5%, and the haze value was 0.4%, when the visible light transmittance was 70.9%.

The change of the visible light transmittance after 200 hours was measured by the acceleration test, using the xenon weather Ometer and using the laminated transparent base material C as a test sample. The change of the visible light transmittance was −0.9%, and the result was shown in table 1.

Example 4

The plasticizer dispersion liquid for the heat-ray shielding film (abbreviated as dispersion liquid D hereafter) according to example 4 was prepared similarly to example 1 excluding a point that manganese acetate was replaced with zinc acetate, as the metal carboxylate.

Wherein, the content of residual methyl isobutyl ketone of the composition D was measured by the dry based moisture meter, and it was found that the content of the residual methyl isobutyl ketone was 3.9 mass %. Further, the dispersion average particle size of the tungsten oxide fine particle in the dispersion liquid D was measured by a microtrack particle size distribution analyzer by Nikkiso Co., Ltd., and it was found that the dispersion average particle size was 30 nm.

The heat-ray shielding film D (abbreviated as shielding film D hereafter) was obtained similarly to the example 1 excluding a point that the composition A was replaced with a composition D, to thereby obtain the heat-ray shielding laminated transparent base material (abbreviated as laminated transparent base material D hereafter) according to example 4. The content of the methyl isobutyl ketone of the shielding film D was calculated to be 0.031 mass %.

As shown in table 1, as the optical characteristics of the laminated transparent base material D, the solar transmittance was 34.8%, and the haze value was 0.4%, when the visible light transmittance was 69.9%.

The change of the visible light transmittance after 200 hours was measured by the acceleration test, using the xenon weather Ometer and using the laminated transparent base material D as a test sample. The change of the visible light transmittance was −0.7%, and the result was shown in table 1.

Example 5

The heat-ray shielding fine particle-containing composition (abbreviated as composition E hereafter) according to example 5 was obtained similarly to the example 1, excluding a point that methyl ethyl ketone (MEK) was used as the organic solvent.

Wherein, the content of residual methyl ethyl ketone of the composition E was measured by a dry based moisture meter, and it was found that the content of the residual methyl ethyl ketone was 3.1 mass %. Further, the dispersion average particle size of the tungsten oxide fine particle in the liquid E was measured by a microtrack particle size distribution analyzer by Nikkiso Co., Ltd., and it was found that the dispersion average particle size was 22 nm.

The heat-ray shielding film E (abbreviated as shielding film E hereafter) was obtained similarly to the example 1 excluding a point that the composition A was replaced with a composition E, to thereby obtain the heat-ray shielding laminated transparent base material (abbreviated as laminated transparent base material E hereafter) according to example 5. The content of the methyl ethyl ketone of the shielding film E was calculated to be 0.025 mass %.

As shown in table 1, as the optical characteristics of the laminated transparent base material E, the solar transmittance was 35.2%, and the haze value was 0.4%, when the visible light transmittance was 70.5%.

The change of the visible light transmittance after 200 hours was measured by the acceleration test, using the xenon weather Ometer and using the laminated transparent base material E as a test sample. The change of the visible light transmittance was −0.9%, and the result was shown in table 1.

Example 6

20 mass % of fine particles a, 10 mass % of methyl trimethoxysilane, and 70 mass % of ethanol were weighed.

They were charged into a paint shaker in which $ZrO_2$ beads with a diameter of 0.3 mm are accommodated, which were then pulverized and dispersed for 6 hours, to thereby prepare a composite tungsten oxide fine particle dispersion liquid. Then, methyl isobutyl ketone was removed using a spray drier, to thereby obtain the composite tungsten oxide fine particles (fine particles b) subjected to surface treatment by a silane compound.

Next, 30 mass % of fine particles b, 10 mass % of the dispersant a, and 60 mass % of methyl isobutyl ketone were weighed. They were charged into a paint shaker in which $ZrO_2$ beads with a diameter of 0.3 mm are accommodated, which were then pulverized and dispersed for 1 hour, to thereby prepare a composite tungsten oxide fine particle dispersion liquid subjected to surface treatment (abbreviated as liquid F hereafter). Further, the dispersion average particle size of the tungsten oxide fine particle in the liquid F was measured by a microtrack particle size distribution analyzer by Nikkiso Co., Ltd., and it was found that the dispersion average particle size was 40 nm.

The heat-ray shielding fine particle-containing composition (abbreviated as composition F hereafter) according to example 6 was obtained similarly to the example 1 excluding a point that the composition F was replaced with a composition F. Wherein, the content of residual methyl isobutyl ketone of the composition F was measured by a dry based moisture meter, and it was found that the content of the residual methyl isobutyl ketone was 3.8 mass %.

The heat-ray shielding film F (abbreviated as shielding film F hereafter) was obtained similarly to the example 1 excluding a point that the composition A was replaced with a composition F, to thereby obtain the heat-ray shielding laminated transparent base material (abbreviated as laminated transparent base material F hereafter) according to example 6. The content of the methyl isobutyl ketone of the shielding film F was calculated to be 0.03 mass %.

As shown in table 1, as the optical characteristics of the laminated transparent base material F, the solar transmittance was 35.7%, and the haze value was 0.8%, when the visible light transmittance was 71.0%.

The change of the visible light transmittance after 200 hours was measured by the acceleration test, using the xenon weather Ometer and using the laminated transparent base material F as a test sample. The change of the visible light transmittance was −0.4%, and the result was shown in table 1.

Example 7

The heat-ray shielding fine particle-containing composition (abbreviated as composition G hereafter) according to example 7 was obtained similarly to the example 1, excluding a point that manganese acetate was replaced with magnesium acetate as the metal carboxylate. Wherein, the content of residual methyl isobutyl ketone of the composition G was measured by the dry based moisture meter, and it was found that the content of the residual methyl isobutyl ketone was 5.0 mass %. Further, the dispersion average particle size of the tungsten oxide fine particle in the dispersion liquid G was measured by a microtrack particle size distribution analyzer by Nikkiso Co., Ltd., and it was found that the dispersion average particle size was 25 nm.

The heat-ray shielding film G (abbreviated as shielding film G hereafter) was obtained similarly to the example 1 excluding a point that the composition A was replaced with a composition G, to thereby obtain the heat-ray shielding laminated transparent base material (abbreviated as laminated transparent base material G hereafter) according to example 7. The content of the methyl isobutyl ketone of the shielding film G was calculated to be 0.04 mass %.

As shown in table 1, as the optical characteristics of the laminated transparent base material G, the solar transmittance was 35.5%, and the haze value was 0.6%, when the visible light transmittance was 70.7%.

The change of the visible light transmittance after 200 hours was measured by the acceleration test, using the xenon weather Ometer and using the laminated transparent base material G as a test sample. The change of the visible light transmittance was −1.2%, and the result was shown in table 1.

Example 8

The heat-ray shielding fine particle-containing composition (abbreviated as composition H hereafter) according to example 8 was obtained similarly to the example 1, excluding a point that manganese acetate was replaced with nickel acetate as the metal carboxylate. Wherein, the content of residual methyl isobutyl ketone of the composition H was measured by the dry based moisture meter, and it was found that the content of the residual methyl isobutyl ketone was 3.7 mass %. Further, the dispersion average particle size of the tungsten oxide fine particle in the dispersion liquid H was measured by a microtrack particle size distribution analyzer by Nikkiso Co., Ltd., and it was found that the dispersion average particle size was 18 nm.

The heat-ray shielding film H (abbreviated as shielding film H hereafter) was obtained similarly to the example 1 excluding a point that the composition A was replaced with a composition H, to thereby obtain the heat-ray shielding laminated transparent base material (abbreviated as laminated transparent base material H hereafter) according to example 8 was obtained. The content of the methyl isobutyl ketone of the shielding film H was calculated to be 0.03 mass %.

As shown in table 1, as the optical characteristics of the laminated transparent base material H, the solar transmittance was 36.1%, and the haze value was 0.4%, when the visible light transmittance was 71.2%.

The change of the visible light transmittance after 200 hours was measured by the acceleration test, using the xenon weather Ometer and using the laminated transparent base material H as a test sample. The change of the visible light transmittance was −0.7%, and the result was shown in table 1.

Example 9

The heat-ray shielding fine particle-containing composition (abbreviated as composition I hereafter) according to example 9 was obtained similarly to the example 1, excluding a point that the manganese acetate was replaced with nickel octoate as the metal carboxylate, and acrylic dispersant having amine-containing group was replaced with acrylic-stylen copolymer dispersant having a carboxylic group as a functional group (molecular weight Mw: 25000, acid value: 110.5, decomposition temperature: 270 deg C., and abbreviated as dispersant b hereafter). Wherein, the content of residual methyl isobutyl ketone of the composition I was measured by the dry based moisture meter, and it was found that the content of the residual methyl isobutyl ketone was 4.2 mass %. Further, the dispersion average particle size of the tungsten oxide fine particle in the dispersion liquid I was measured by a microtrack particle size distribution analyzer by Nikkiso Co., Ltd., and it was found that the dispersion average particle size was 17 nm.

The heat-ray shielding film I (abbreviated as shielding film I hereafter) was obtained similarly to the example 1 excluding a point that the composition A was replaced with a composition I, to thereby obtain the heat-ray shielding laminated transparent base material (abbreviated as laminated transparent base material I hereafter) according to example 9 was obtained. The content of the methyl isobutyl ketone of the shielding film I was calculated to be 0.034 mass %.

As shown in table 1, as the optical characteristics of the laminated transparent base material I, the solar transmittance was 35.0%, and the haze value was 0.4%, when the visible light transmittance was 70.3%.

The change of the visible light transmittance after 200 hours was measured by the acceleration test, using the xenon weather Ometer and using the laminated transparent base material I as a test sample. The change of the visible light transmittance was −0.8%, and the result was shown in table 1.

Example 10

The heat-ray shielding fine particle-containing composition (abbreviated as composition J hereafter) according to example 10 was obtained similarly to the example 1, excluding a point that manganese acetate was replaced with sodium acetate as the metal carboxylate. Wherein, the content of residual methyl isobutyl ketone of the composition J was measured by the dry based moisture meter, and it was found that the content of the residual methyl isobutyl ketone was 3.1 mass %. Further, the dispersion average particle size of the tungsten oxide fine particle in the dispersion liquid J was measured by a microtrack particle size distribution analyzer by Nikkiso Co., Ltd., and it was found that the dispersion average particle size was 24 nm.

The heat-ray shielding film J (abbreviated as shielding film J hereafter) was obtained similarly to the example 1 excluding a point that the composition A was replaced with a composition J, to thereby obtain the heat-ray shielding laminated transparent base material (abbreviated as laminated transparent base material J hereafter) according to example 10. The content of the methyl isobutyl ketone of the shielding film J was calculated to be 0.025 mass %.

As shown in table 1, as the optical characteristics of the laminated transparent base material J, the solar transmittance was 35.9%, and the haze value was 0.4%, when the visible light transmittance was 71.3%.

The change of the visible light transmittance after 200 hours was measured by the acceleration test, using the xenon weather Ometer and using the laminated transparent base material J as a test sample. The change of the visible light transmittance was −0.5%, and the result was shown in table 1.

Example 11

8.8 g of $RbNO_3$ was dissolved into 13.5 g of water, which was then added to 45.3 g of $H_2WO_4$ (corresponding to Rb/W (molar ratio)=0.33), and was sufficiently stirred, and thereafter was dried. The dried material was heated under supply of 2% $H_2$ gas with $N_2$ gas as a carrier, and was sintered for 30 minutes at a temperature of 800 deg C., and thereafter was sintered for 90 minutes under $N_2$ gas atmosphere at the same temperature, to thereby obtain fine particles (abbreviated as fine particles c hereafter).

The composition formula of the fine particles c was expressed by $Rb_{0.33}WO_3$, wherein the powder color was expressed in such a way that L* was 36.3765, a* was −0.2145, and b* was −3.7609.

The heat-ray shielding fine particle-containing composition (abbreviated as composition K hereafter) according to example 11 was obtained similarly to the example 1 excluding a point that the particles a were replaced with particles c as the composite tungsten oxide fine particles, and manganese acetate was replaced with manganese octoate as the metal carboxylate. Wherein, the content of the residual methyl isobutyl ketone of the composition k was measured by a dry based moisture meter, and it was found that the content of the residual methyl isobutyl ketone was 3.5 mass %. Further, the dispersion average particle size of the tungsten oxide fine particle in the composition K was measured by a microtrack particle size distribution analyzer by Nikkiso Co., Ltd., and it was found that the dispersion average particle size was 21 nm.

The heat-ray shielding film K (abbreviated as shielding film K hereafter) was obtained similarly to the example 1 excluding a point that the composition A was replaced with a composition K, to thereby obtain the heat-ray shielding laminated transparent base material (abbreviated as laminated transparent base material K hereafter) according to example 11 was obtained. The content of the methyl isobutyl ketone of the shielding film K was calculated to be 0.028 mass %.

As shown in table 1, as the optical characteristics of the laminated transparent base material K, the solar transmittance was 34.8%, and the haze value was 0.4%, when the visible light transmittance was 69.7%.

The change of the visible light transmittance after 200 hours was measured by the acceleration test, using the xenon weather Ometer and using the laminated transparent base material K as a test sample. The change of the visible light transmittance was −0.7%, and the result was shown in table 1.

Comparative Example 1

The heat-ray shielding fine particle-containing composition (abbreviated as composition L hereafter) according to comparative example 1 was obtained similarly to the example 1, excluding a point that stirring for 6 hours, under a normal pressure, at a temperature of 80 deg C. was carried out to remove methyl isobutyl ketone without using the vacuum stirring type drier capable of performing vacuum distillation. Wherein, the content of residual methyl isobutyl ketone of the composition L was measured by a dry based moisture meter, and it was found that the content of the residual methyl isobutyl ketone was 7.8 mass %. Further, the dispersion average particle size of the tungsten oxide fine particle in the liquid L was measured by a microtrack particle size distribution analyzer by Nikkiso Co., Ltd., and it was found that the dispersion average particle size was 25 nm.

The heat-ray shielding film for the heat-ray shielding laminated transparent base material of comparative example 1 (abbreviated as shielding film L hereafter) was obtained similarly to the example 1 excluding a point that the composition A was replaced with a composition L. The content of the methyl isobutyl ketone of the shielding film L was calculated to be 0.62 mass %.

The residual methyl isobutyl ketone of the used composition L was increased to 7.8 mass %, and the content of the methyl isobutyl ketone contained in the shielding film L was further increased to 0.062 mass %. Therefore, the residual methyl isobutyl ketone could not be sufficiently removed during kneading with the polyvinyl acetal resin. Thus, bubbles were observed in the shielding film L and an outer appearance was not good.

The obtained shielding film L was sandwiched between two inorganic glasses, to thereby obtain the heat-ray shielding laminated transparent base material of comparative example 1 (abbreviated as the laminated transparent base material L hereafter) by a publicly-known method. As shown in table 1, as the optical characteristics of the laminated transparent base material L, the solar transmittance was 37.1%, and the haze value was 1.9%, when the visible light transmittance was 71.2%. it seems that this is because agglutination of fine particles occur because the methyl isobutyl ketone was removed by carrying out long term heating at a normal pressure without using the vacuum stirring type drier, thus increasing the haze and damaging the transparency. The result thereof is shown in table 1.

The acceleration test using the xenon weather Ometer was not executed.

Comparative Example 2

The heat-ray shielding fine particle-containing composition (abbreviated as composition M hereafter) according to comparative example 2 was obtained similarly to the example 1, excluding a point that the metal carboxylate was not added. Wherein, the content of the residual methyl isobutyl ketone of the composition M was measured by a dry based moisture meter, and it was found that the content of the residual methyl isobutyl ketone was 3.2 mass %.

Further, the dispersion average particle size of the tungsten oxide fine particle in the dispersion liquid M was measured by a microtrack particle size distribution analyzer by Nikkiso Co., Ltd., and it was found that the dispersion average particle size was 31 nm.

The heat-ray shielding film M (abbreviated as shielding film M hereafter) was obtained similarly to the example 1 excluding a point that the composition A was replaced with a composition M, to thereby obtain the heat-ray shielding laminated transparent base material (abbreviated as laminated transparent base material M hereafter) according to comparative example 2. The content of the methyl isobutyl ketone of the shielding film M was calculated to be 0.026 mass %.

As shown in table 1, as the optical characteristics of the laminated transparent base material M, the solar transmittance was 35.0%, and the haze value was 0.4%, when the visible light transmittance was 70.0%.

The change of the visible light transmittance after 200 hours was measured by the acceleration test, using the xenon weather Ometer and using the laminated transparent base material M as a test sample. The change of the visible light transmittance was −4.8%. It seems that this is because the composite tungsten oxide fine particles are degraded with a lapse of time because the metal carboxylate is not added, thus increasing the change of the visible light transmittance. The result thereof was shown in table 1.

| | Heat-ray shielding fine particle-containing composition | | | | | Heat-ray shielding film | Optical characteristics of heat-ray shielding laminated glass | | | 200 hours after XWOM test Change of |
|---|---|---|---|---|---|---|---|---|---|---|
| | Fine particles | | | | Residual organic solvent | | Visible | Solar | | visible |
| | | Average particle | | | | Content of residual | light trans- | light trans- | | light trans- |
| | Kind | size (nm) | Metal carboxylate | Dispersant | Kind | Content (%) | organic solvent (%) | mittance (%) | mittance (%) | Haze (%) | mittance (%) |
| Example 1 | a | 19 | Manganese acetate | a | MIBK·※2 | 3.5 | 0.028 | 70.2 | 35.1 | 0.4 | −0.8 |
| Example 2 | a | 23 | Iron acetate | a | MIBK | 3.7 | 0.030 | 71.6 | 35.9 | 0.4 | −0.5 |
| Example 3 | a | 25 | Copper acetate | a | MIBK | 2.8 | 0.022 | 70.9 | 35.5 | 0.4 | −0.9 |
| Example 4 | a | 30 | Zinc acetate | a | MIBK | 3.9 | 0.031 | 69.9 | 34.8 | 0.4 | −0.7 |
| Example 5 | a | 22 | Manganese acetate | a | MEK·※3 | 3.1 | 0.025 | 70.5 | 35.2 | 0.4 | −0.9 |
| Example 6 | b·※1 | 40 | Manganese acetate | a | MIBK | 3.8 | 0.030 | 71.0 | 35.7 | 0.8 | −0.4 |
| Example 7 | a | 25 | Mangasium acetate | a | MIBK | 5.0 | 0.040 | 70.7 | 35.5 | 0.6 | −1.2 |
| Example 8 | a | 18 | Nickel acetate | a | MIBK | 3.7 | 0.030 | 71.2 | 36.1 | 0.4 | −0.7 |
| Example 9 | a | 17 | Nickel octoate | b | MIBK | 4.2 | 0.034 | 70.3 | 35.0 | 0.4 | −0.8 |
| Example 10 | a | 24 | Sodium acetate | a | MIBK | 3.1 | 0.025 | 71.3 | 35.9 | 0.4 | −0.5 |
| Example 11 | c | 21 | Manganese octoate | a | MIBK | 3.5 | 0.028 | 69.7 | 34.8 | 0.4 | −0.7 |
| Com* Example 1 | a | 25 | Magnesium acetate | a | MIBK | 7.8 | 0.062 | 71.2 | 37.1 | 1.9 | Not performed |
| Com* Example 2 | a | 31 | Not added | a | MIBK | 3.2 | 0.026 | 70.0 | 35 | 0.4 | −4.8 |

※1 Composite tungsten oxide fine particles subjected to surface treatment by silane compound
※2 Methyl isobutyl ketone
※3 Methyl ethyl ketone
※Com* . . . Comparative Evaluation of Examples 1 to 11 and Comparative Examples 1 and 2

In examples 1 to 11, laminated transparent base materials A to K with good outer appearance could be obtained without generating bubbles on the heat-ray shielding film, because the residual content of the organic solvent was set in a range of 5 mass % or less by using the vacuum stirring type drier. Further, in the drying step, the organic solvent could be removed in a shorter period of time by using the vacuum type stirring drier. Accordingly, agglutination of the composite tungsten fine particles due to long-term heating could be prevented, and therefore laminated transparent base materials A to K with low haze could be obtained.

Further, by adding the metal carboxylate, degradation of the composite tungsten oxide fine particles could be suppressed, and the laminated transparent base materials A to K having excellent weather resistance property, with small change of the optical characteristics even in a case of a long-term use, could be obtained.

Meanwhile, in the comparative example 1, the organic solvent was removed by being heated and stirred at a normal pressure, and therefore the residual content of the organic solvent was increased to 5 mass % or more. Therefore, the residual organic solvent remained during kneading was not sufficiently removed, thus generating the bubbles on the shielding film L, and the outer appearance was deteriorated. Further, the agglutination of the composite tungsten oxide fine particles occur due to long-term heating without using the drier to remove the organic solvent, thus increasing the haze and damaging the obtained laminated transparent base material.

In the comparative example 2, the composite tungsten oxide fine particles were degraded with a lapse of time and the change of the visible light transmittance of the laminated transparent base material M was largely reduced (deteriorated) in the acceleration test conducted by a xenon weather Ometer, because the metal carboxylate was not added.

The invention claimed is:

1. A method for manufacturing a heat-ray shielding fine particle-containing composition, comprising:
    a first step of obtaining a dispersion liquid by dispersing composite tungsten oxide fine particles with an average particle size of 40 nm or less, expressed by a general formula $M_yWO_z$ (wherein M is one kind or more elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexagonal crystal structure, and dispersing a dispersant into an organic solvent with a boiling point of 120° C. or less;
    a second step of obtaining a mixture by mixing metal carboxylate into the dispersion liquid obtained by the first step; and
    a third step of drying the mixture obtained by the second step to thereby obtain a heat-ray shielding fine particle-containing composition, and setting a content of the organic solvent remained in the heat-ray shielding fine particle-containing composition to 5 mass % or less.

2. The method for manufacturing the heat-ray shielding fine particle-containing composition according to claim 1, wherein metal constituting the metal carboxylate is at least one kind of elements selected from sodium, potassium, magnesium, calcium, nickel, manganese, cerium, zinc, copper, and iron.

3. The method for manufacturing the heat-ray shielding fine particle-containing composition according to claim 1, wherein the organic solvent is at least one kind of elements selected from toluene, methylethyl ketone, methyl isobutyl ketone, butyl acetates, isopropyl alcohol, and ethanol.

4. The method for manufacturing the heat-ray shielding fine particle-containing composition according to claim 1, wherein the composite tungsten oxide fine particles are fine particles with an average particle size of 1 nm or more and 25 nm or less.

5. The method for manufacturing the heat-ray shielding fine particle-containing composition according to claim 1, wherein the composite tungsten oxide fine particles are subjected to surface treatment by a compound containing one kind or more elements of Si, Ti, Zr, and Al.

6. A heat-ray shielding fine particle-containing composition manufactured by the method for manufacturing the heat-ray shielding fine particle-containing composition according to claim 1.

7. A heat-ray shielding film manufactured by
    kneading the heat-ray shielding fine particle-containing composition of claim 6, a polyvinyl acetal resin, and a plasticizer to form a mixture, and
    molding the mixture into a film shape.

8. The heat-ray shielding film according to claim 7, wherein content of an organic solvent with a boiling point of 120° C. or less exceeds 0 mass % and 0.06 mass % or less.

9. A heat-ray shielding laminated transparent base material, wherein the heat-ray shielding film of claim 7 is disposed between two transparent base materials.

* * * * *